United States Patent
Han et al.

(10) Patent No.: US 12,126,827 B2
(45) Date of Patent: Oct. 22, 2024

(54) METHOD AND DEVICE FOR ENCODING AND DECODING IMAGE USING MOTION VECTOR RESOLUTION SCALING

(71) Applicant: Dolby Laboratories Licensing Corporation, San Francisco, CA (US)

(72) Inventors: Jong Ki Han, Seoul (KR); Jae Yung Lee, Gwacheon-si (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/504,337

(22) Filed: Nov. 8, 2023

(65) Prior Publication Data

US 2024/0073444 A1 Feb. 29, 2024

Related U.S. Application Data

(63) Continuation of application No. 15/537,718, filed as application No. PCT/KR2016/000253 on Jan. 11, 2016, now abandoned.

(30) Foreign Application Priority Data

Jan. 13, 2015 (KR) .................. 10-2015-0006074

(51) Int. Cl.
*H04N 19/53* (2014.01)
*H04N 19/105* (2014.01)
(Continued)

(52) U.S. Cl.
CPC ........... *H04N 19/53* (2014.11); *H04N 19/105* (2014.11); *H04N 19/136* (2014.11); *H04N 19/17* (2014.11);
(Continued)

(58) Field of Classification Search
CPC ................... H04N 19/523; H04N 19/53
See application file for complete search history.

(56) References Cited

U.S. PATENT DOCUMENTS

2008/0175322 A1 7/2008 Lee et al.
2009/0016434 A1 1/2009 Amonou et al.
(Continued)

FOREIGN PATENT DOCUMENTS

| CN | 101120591 A | 2/2008 |
|---|---|---|
| CN | 101194513 A | 6/2008 |

(Continued)

OTHER PUBLICATIONS

English translation of Chinese Patent Office Action for Application No. 202110756385.4, dated Jun. 9, 2023 (13 pages).
(Continued)

*Primary Examiner* — Jayanti K Patel
*Assistant Examiner* — Christopher Kingsbury Glover
(74) *Attorney, Agent, or Firm* — Michael Best & Friedrich LLP (57) ABSTRACT

A video encoding method according to an embodiment of the present invention includes generating header information that includes information about resolutions of motion vectors of respective blocks, determined based on motion prediction for a unit image. Here, the header information includes flag information indicating whether resolutions of all motion vectors included in the unit image are integer-pixel resolutions. Further, a video decoding method according to another embodiment of the present invention includes extracting information about resolutions of motion vectors of each unit image from header information included in a target bitstream to be decoded; and a decoding unit for decoding the unit image based on the resolution information. Here, the header information includes flag information indi-
(Continued)

cating whether resolutions of all motion vectors included in the unit image are integer-pixel resolutions.

6 Claims, 10 Drawing Sheets

(51) Int. Cl.
| | |
|---|---|
| *H04N 19/136* | (2014.01) |
| *H04N 19/17* | (2014.01) |
| *H04N 19/27* | (2014.01) |
| *H04N 19/50* | (2014.01) |
| *H04N 19/51* | (2014.01) |
| *H04N 19/52* | (2014.01) |
| *H04N 19/523* | (2014.01) |
| *H04N 19/70* | (2014.01) |

(52) U.S. Cl.
CPC .............. *H04N 19/27* (2014.11); *H04N 19/50* (2014.11); *H04N 19/51* (2014.11); *H04N 19/523* (2014.11); *H04N 19/70* (2014.11); *H04N 19/52* (2014.11)

(56) References Cited

U.S. PATENT DOCUMENTS

| | | | | |
|---|---|---|---|---|
| 2010/0111183 | A1* | 5/2010 | Jeon | H04N 19/61 375/E7.125 |
| 2011/0007801 | A1 | 1/2011 | Andersson et al. | |
| 2011/0206125 | A1* | 8/2011 | Chien | H04N 19/61 375/E7.209 |
| 2012/0005365 | A1 | 1/2012 | Ma et al. | |
| 2012/0207220 | A1 | 8/2012 | Kim et al. | |
| 2012/0263235 | A1 | 10/2012 | Sugio et al. | |
| 2013/0051468 | A1 | 2/2013 | Tao et al. | |
| 2013/0058397 | A1 | 3/2013 | Song et al. | |
| 2013/0202047 | A1 | 8/2013 | Song et al. | |
| 2014/0119446 | A1 | 5/2014 | Bivolarsky | |
| 2015/0195527 | A1* | 7/2015 | Zhou | H04N 19/43 375/240.02 |
| 2015/0195562 | A1* | 7/2015 | Li | H04N 19/109 375/240.16 |
| 2020/0304801 | A1 | 9/2020 | Gao et al. | |

FOREIGN PATENT DOCUMENTS

| | | |
|---|---|---|
| CN | 101340578 A | 1/2009 |
| CN | 101690220 A | 3/2010 |
| CN | 101783957 A | 7/2010 |
| CN | 102026002 A | 4/2011 |
| CN | 102210150 A | 10/2011 |
| CN | 102611887 A | 7/2012 |
| CN | 102783149 A | 11/2012 |
| CN | 103155560 A | 6/2013 |
| CN | 103313052 A | 9/2013 |
| CN | 103444181 A | 12/2013 |
| CN | 103688543 A | 3/2014 |
| CN | 104065972 A | 9/2014 |
| CN | 104137549 A | 11/2014 |
| EP | 1237376 A2 | 9/2002 |
| JP | 2004064518 A | 2/2004 |
| JP | 2009153102 A | 7/2009 |
| JP | 2009224854 A | 10/2009 |
| JP | 2011091498 A | 5/2011 |
| JP | 2012120238 A | 6/2012 |
| JP | 2013255290 A | 12/2013 |
| JP | 2014146918 A | 8/2014 |
| KR | 20100019088 A | 2/2010 |
| KR | 1020100012149 A | 2/2010 |
| KR | 1020130044263 A | 5/2013 |
| KR | 10-2013-0098223 A | 9/2013 |
| KR | 1020140019012 A | 2/2014 |
| KR | 10-2014-0075661 A | 6/2014 |
| WO | 2011/053054 A2 | 5/2011 |

OTHER PUBLICATIONS

English translation of Chinese Patent Office Action for Application No. 202110756404.3, dated May 18, 2023 (13 pages).
English translation of Chinese Patent Office Action for Application No. 202110756935.2, dated May 18, 2023 (12 pages).
English translation of Chinese Patent Office Action for Application No. 202110756938.6, dated Jun. 9, 2023 (13 pages).
International Search Report issued on Apr. 19, 2016 in counterpart International Patent Application No. PCT/KR2016/000253 (4 pages, with English translation).
Li et al., "Adaptive motion vector resolution for screen content," Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, JCTVC-R0106_r1.
Li, B. et al., "Adaptive Motion Vector Resolution for Screen Content," JCTVC-S0085, 2014, 10 pages in English.
Li, Ming et al., "AHG18: Comments on the Implementation of Resolution Adaption on HEVC," JCTVC-G329, 7th Meeting: Geneva, CH, 2011, 14 pages in English.
Li, B., et al. "Adaptive motion vector resolution for screen content." Doc. JCTVC-S0085 (2014) (14 pages).

* cited by examiner

| DIFFERENTIAL MOTION VECTOR | CODE NUMBER | BIT STRING |
|---|---|---|
| 0 | 0 | 1 |
| 1/4 | 1 | 010 |
| -1/4 | 2 | 011 |
| 2/4 | 3 | 00101 |
| -2/4 | 4 | 00110 |
| ... | ... | ... |
| 2 | 15 | 000010000 |
| ... | ... | ... |
| 3 | 23 | 000010000 |
| ... | ... | ... |

(a)

| DIFFERENTIAL MOTION VECTOR | CODE NUMBER | BIT STRING |
|---|---|---|
| 0 | 0 | 1 |
| 1 | 1 | 010 |
| -1 | 2 | 011 |
| 2 | 3 | 00101 |
| -2 | 4 | 00110 |
| 3 | 5 | ... |
| -3 | 6 | |
| ... | ... | ... |
| ... | ... | ... |

| Slice_segment_header( ) | Descriptor |
|---|---|
| ...... | |
| if (slice_type == P \|\| slice_type == B ) { | |
| ....... | |
| if (SCC_AMVR_Enable_flag) | |
| Integer_MV_Resolution_flag | u(1) |
| } | |
| ...... | |

| | Descriptor |
|---|---|
| Slice_segment_header ( ) { | |
| ..... | |
| if (slice_type == P : : slice_type == B ) { | |
| ..... | |
| if (SCC_AMVR_Enable_flag) { | |
| Integer_MV_Resolution_flag | u(1) |
| num_NSC_Region | u(V) |
| if (Integer_MV_resiution_liag && NumNonScreenContentsRegion) { | |
| for (i=0; i<NumNonScreenContentsRegion ; i++) { | |
| start_nse_idx[i] | u(V) |
| end_use_idx[i] | u(V) |
| } | |
| } | |
| } | |
| } | |
| ..... | |

METHOD AND DEVICE FOR ENCODING AND DECODING IMAGE USING MOTION VECTOR RESOLUTION SCALING

CROSS-REFERENCE TO RELATED APPLICATIONS

This application is a continuation of U.S. patent application Ser. No. 15/537,718, filed Jun. 19, 2017, which claims the benefit under 35 USC 119(a) of PCT Application No. PCT/KR2016/000253, filed on Jan. 11, 2016, which claims the benefit of Korean Patent Application No. 10-2015-0006074 filed Jan. 13, 2015, in the Korean Intellectual Property Office, the entire disclosure of each of which are incorporated herein by reference for all purposes.

TECHNICAL FIELD

The present invention generally relates to a video encoding/decoding method and apparatus and, more particularly, to a video encoding/decoding method and apparatus, which may more efficiently process artificially created images, such as screen content.

BACKGROUND ART

Recently, as the bandwidth of wireless communication has been widened, and the performance of mobile devices has been improved, various types of multimedia services have been provided. In particular, the variety of types of video service has increased, and service based on video content, which is artificially created through computer graphic software or the like, as well as video service based on images captured by cameras, has also gradually come to occupy a larger portion thereof. Hereinafter, artificially created video content is defined as "screen content". Unlike typical natural images, screen content has a limited range of color difference signals, has relatively low noise, and has characteristics differing from natural images, having high color saturation. Meanwhile, "screen content" defined in the present invention also means a form in which screen content is combined with typical natural images, as well as the case where the entire video is composed of screen content.

Examples of such screen content may include e-Learning content, game broadcasting content or home-shopping content. As examples of e-Learning content, the form of a user interface in which educational content is indicated only by text, or the form in which a natural image is provided to be inserted into the user interface in the form of a frame may be considered, and this type of content may be examples of screen content.

Such screen content is characterized in that, unlike natural images, a portion indicating the boundary of an object may be clearly identified for each pixel. That is, unlike typical natural images, there is only a slim possibility that the motion of an object will occur for each sub-pixel.

Therefore, when the characteristics of such screen content are accounted for in encoding/decoding processes, encoding/decoding efficiency is expected to be further improved.

In relation to this, Korean Patent Application Publication No. 10-2013-0078569 (entitled "Region of Interest based Screen Contents Quality Improving Video Encoding/Decoding Method and Apparatus Thereof") discloses a method for determining a major Region of Interest (RoI) in consideration of the characteristics of input screen content video, reflecting the major ROI into a video encoding process, and allocating more information to the major ROI, thus improving subjective video quality.

Meanwhile, the Joint Collaborative Team on Video Coding (JCT-VC) organized by the Moving Picture Experts Group (MPEG) and the Video Coding Experts Group (VCEG) has recently developed a High Efficiency Video Coding (HEVC) extension for screen content coding. In Screen Content Coding (SCC) standards, various methods for efficient encoding of screen content video based on HEVC are under discussion.

DISCLOSURE

Technical Problem

The present invention has been made keeping in mind the above problems occurring in the prior art, and an object of the present invention is to provide a video encoding/decoding method and apparatus, which variously set the resolutions of motion vectors depending on whether screen content video is included.

However, the technical objects to be accomplished by the present embodiments are not limited to the above-described technical objects, and other technical objects may be present.

Technical Solution

In order to accomplish the above object, a video encoding method according to a first aspect of the present invention includes generating header information that includes information about resolutions of motion vectors of respective blocks, determined based on motion prediction for a unit image. Here, the header information includes flag information indicating whether resolutions of all motion vectors included in the unit image are integer-pixel resolutions.

Further, a video decoding method according to a second aspect of the present invention includes extracting information about resolutions of motion vectors of each unit image from header information included in a target bitstream to be decoded; and a decoding unit for decoding the unit image based on the resolution information. Here, the header information includes flag information indicating whether resolutions of all motion vectors included in the unit image are integer-pixel resolutions.

Furthermore, a video encoding apparatus according to a third aspect of the present invention includes a bitstream generation unit for including information about resolutions of motion vectors of respective blocks, determined based on motion prediction for a unit image, in header information of a bitstream. Here, the header information includes flag information indicating whether resolutions of all motion vectors included in the unit image are integer-pixel resolutions.

Furthermore, a video decoding apparatus according to a fourth aspect of the present invention includes a parsing unit for extracting information about resolutions of motion vectors of each unit image from header information included in a target bitstream to be decoded, and a decoding unit for decoding the unit image based on the resolution information, wherein the header information includes flag information indicating whether resolutions of all motion vectors included in the unit image are integer-pixel resolutions.

Advantageous Effects

In accordance with the technical solution of the present invention, the resolutions of motion vectors may be set to integer-pixel resolutions for an image including screen content, thus improving the efficiency of a video encoding process and a video decoding process.

BEST MODE

Embodiments of the present invention are described with reference to the accompanying drawings in order to describe the present invention in detail so that those having ordinary knowledge in the technical field to which the present invention pertains can easily practice the present invention. However, the present invention may be implemented in various forms, and is not limited by the following embodiments. In the drawings, the illustration of components that are not directly related to the present invention will be omitted, for clear description of the present invention, and the same reference numerals are used to designate the same or similar elements throughout the drawings.

Further, throughout the entire specification, it should be understood that a representation indicating that a first component is "connected" to a second component may include the case where the first component is electrically connected to the second component with some other component interposed therebetween, as well as the case where the first component is "directly connected" to the second component.

Furthermore, element units described in the embodiments of the present invention are independently shown in order to indicate different and characteristic functions, but this does not mean that each of the element units is formed of a separate piece of hardware or software. That is, the element units are arranged and included for convenience of description, and at least two of the element units may form one element unit or one element unit may be divided into a plurality of element units to perform their own functions. An embodiment in which the element units are integrated and an embodiment in which the element units are separated are included in the scope of the present invention, unless it departs from the essence of the present invention.

Figure 1:
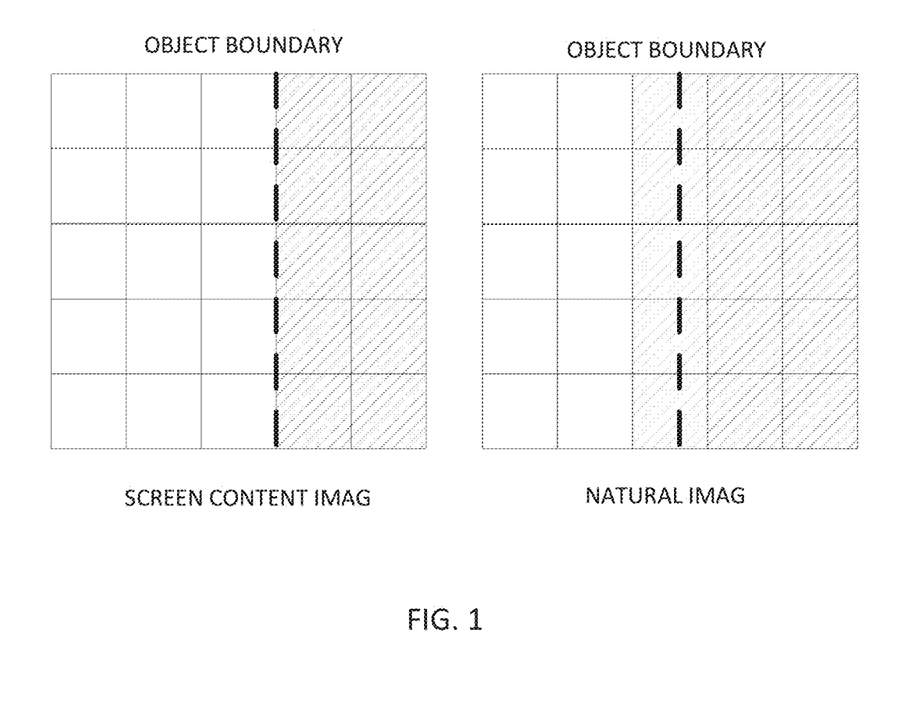
FIG. 1 is a diagram showing the characteristics of screen content proposed in the present invention.

FIG. 1 is a diagram showing the characteristics of screen content proposed in the present invention.

As described above, screen content is characterized in that, unlike a natural image, a portion indicating the boundary of an object may be clearly identified for each pixel. That is, the boundary of an object in a screen content image shown on the left side of FIG. 1 is clearly identified for each integer pixel, however, in a typical natural image shown on the right side thereof, there is a strong possibility that the motion of an object will occur for each sub-pixel. The present invention is intended to utilize such screen content characteristics for encoding/decoding processes.

Figure 2:
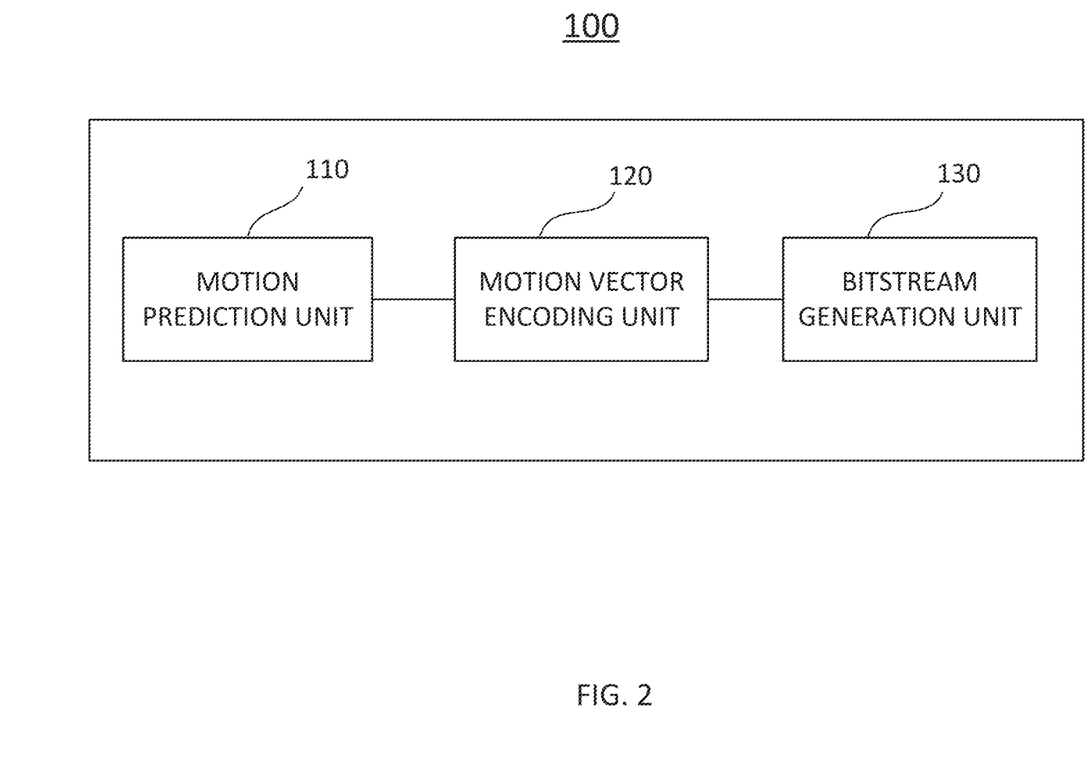
FIG. 2 is a block diagram showing the configuration of a video encoding apparatus according to an embodiment of the present invention.

FIG. 2 is a block diagram showing the configuration of a video encoding apparatus according to an embodiment of the present invention.

A video encoding apparatus 100 includes a motion prediction unit 110 for performing motion prediction, a motion vector encoding unit 120, and a bitstream generation unit 130 for generating a bitstream that includes information about the resolutions of motion vectors for respective blocks.

In an inter-prediction procedure, the motion prediction unit 110 searches for the predicted block most similar to the current encoding target block from reference pictures. Here, in the case of screen content, motion prediction is performed on a per-integer-pixel basis depending on the characteristics of the image. Accordingly, in the case of screen content, the resolution of a motion vector indicating the predicted block, selected based on motion prediction, is also determined on a per-integer-pixel basis. In a typical video compression procedure, motion prediction is performed on a per-sub-pixel basis, such as a half-pixel unit or a ¼-pixel unit, as well as an integer-pixel unit. In contrast, in screen content, motion prediction is performed on a per-integer-pixel basis, and thus encoding efficiency may be improved.

Meanwhile, such motion prediction is performed on a unit image, and such a unit image may be a slice-based unit image, a picture-based unit image, or a sequence-based unit image.

The motion vector encoding unit 120 encodes a motion vector of each block determined by the motion prediction unit 110. For this, a predicted motion vector (PMV) for the target block to be encoded is generated using information about the motion vectors of neighboring blocks, and the difference value between the predicted motion vector and the motion vector of the target block to be currently encoded is encoded. Here, when a low unit-based resolution, such as an integer unit, is applied, the number of bits used to encode motion vectors may be reduced. When a sub-pixel resolution, such as a half-pixel, a ¼ pixel, or a ⅛ pixel, is applied, the number of bits required to encode motion vectors increases. This will be described in greater detail with reference to the attached drawings.

Figure 3:
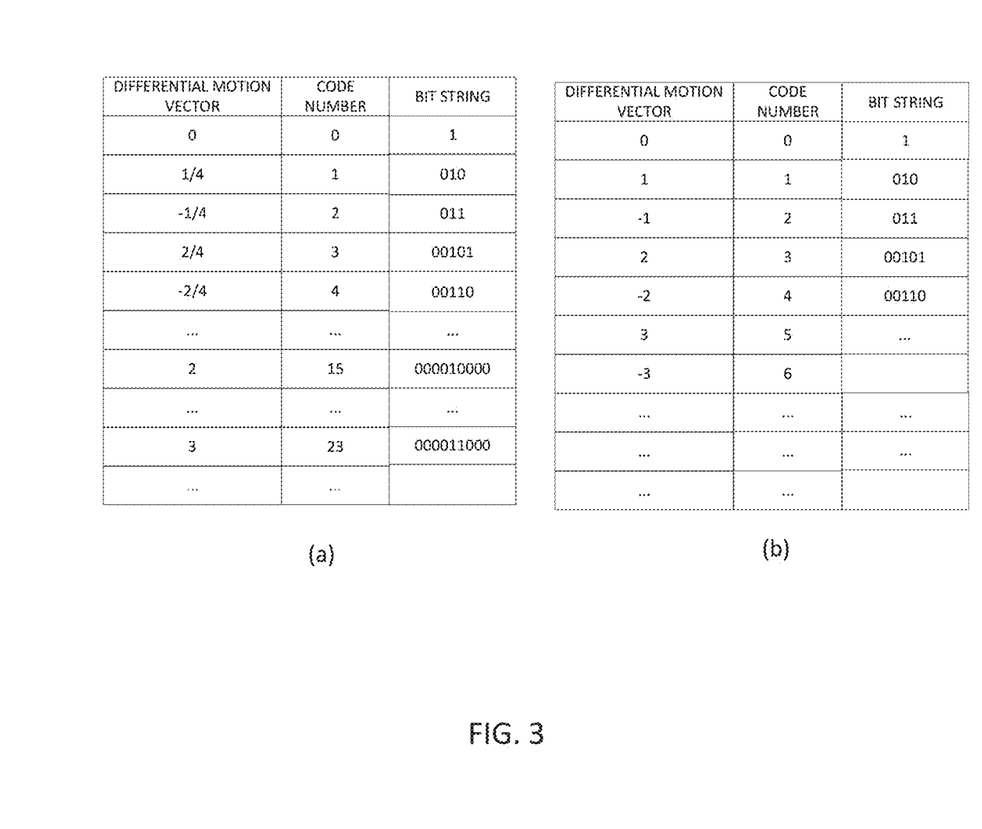
FIG. 3 is a diagram showing motion vector encoding applied to the embodiment of the present invention.

FIG. 3 is a diagram showing motion vector encoding to be applied to the embodiment of the present invention.

The motion vector encoding unit 120 may use an encoding scheme such as a first-order exponential-Golomb code in order to encode a differential motion vector. For example, the drawing shown in FIG. 3(*a*) illustrates an example of a codebook required to encode the motion vector to which a ¼ pixel resolution is applied, and the drawing shown in FIG. 3(*b*) illustrates an example of a codebook required to encode the motion vector to which an integer-pixel resolution is applied. By means of these codebooks, it can be seen that the lengths of codewords to be used for encoding differ from each other depending on the resolution.

For example, when ¼ pixel resolution is applied, if a differential motion vector is (3,2), a bitstream of '000011000' having a code number of '23' is used to encode '3', and a bitstream of '000010000' having a code number of '15' is used to encode '2'. In contrast, when an integer-pixel resolution is applied, if the differential motion vector is (3,2), a bitstream having a code number of '5' and a bitstream having a code number of '3' are used, thus greatly improving encoding efficiency.

In this way, the reason for using long codewords to encode a motion vector of small-magnitude is that both codewords required to encode motion vectors having a ½ pixel resolution and a ¼ pixel resolution and codewords required to encode motion vectors having an integer-pixel resolution are used together. Against this background, in the screen content, the motion vector is determined on a per-integer-pixel basis, and thus encoding efficiency may be improved.

The bitstream generation unit 130 may generate a bitstream from data, which is output through inter prediction, intra prediction, frequency transform, quantization, and entropy coding procedures, based on a syntax structure set according to the video compression standard.

Further, the bitstream generation unit 130 generates the bitstream by including the information about the resolution of the motion vector for each block determined based on motion prediction in the header information of the bitstream.

Here, the header information includes flag information indicating whether the resolutions of all 5 motion vectors included in a unit image are integer-pixel units. For example, when the unit image is screen content, all of the motion vectors of the image are integer-pixel units, and thus a flag indicating this state is generated. A video decoding unit for receiving such a bitstream performs decoding on a per-integer-pixel basis in response to the corresponding flag, thus improving decoding efficiency.

Furthermore, the bitstream generation unit 130 generates a bitstream by including information about motion vectors encoded by the motion vector encoding unit 120 in the bitstream.

Figure 4:
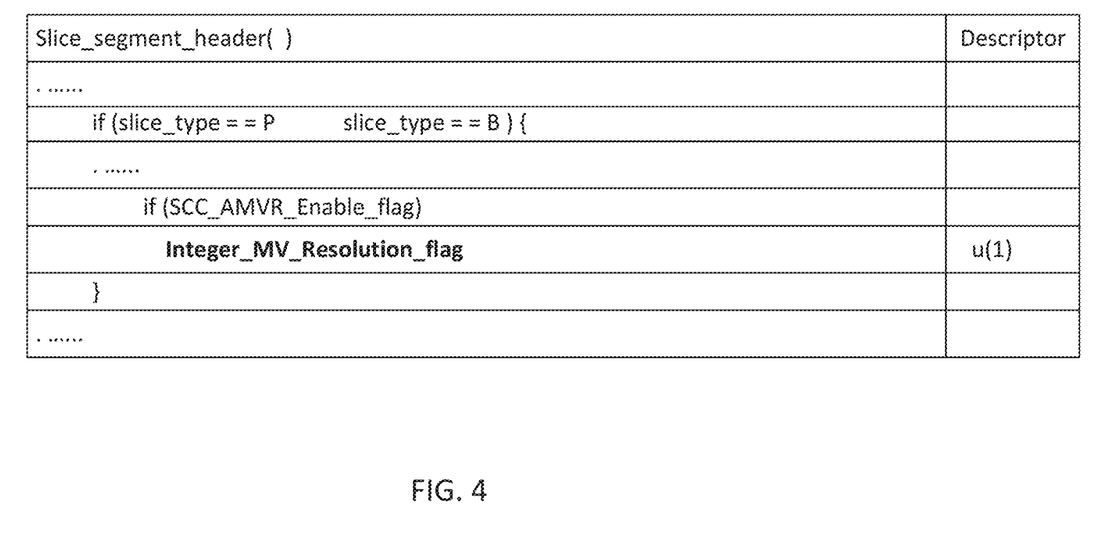
FIG. 4 is a diagram showing a syntax structure used in the video encoding apparatus according to an embodiment of the present invention.

FIG. 4 is a diagram showing a syntax structure used by the video encoding apparatus according to an embodiment of the present invention.

FIG. 4 illustrates an embodiment in which motion prediction is performed on a slice-unit image, and the resolution information of motion vectors is recorded on a slice header, and this corresponds to an example given for the convenience of description.

In the present invention, as the result of motion prediction, when a unit image is screen content, the flag Integer_MV_Resolution_flag, indicating whether the resolution of motion vectors is an integer-pixel unit, is set. For example, when the value of the flag is set to '1', it indicates that the resolution of the motion vectors of the unit image is an integer-pixel unit.

Meanwhile, the flag SCC_AMVR_Enable_flag, indicating whether the resolution of each motion vector of a unit image is in a changeable state, may be additionally set. The case where the value of the corresponding flag is set to 1 indicates that the resolution of the motion vector of the unit image is in a changeable state, whereas the case where the value of the flag is set to 0 indicates that the resolution of the motion vector of the unit image is not in a changeable state.

Here, information about the resolutions of the motion vectors of blocks in a unit image may be included in a slice header, a sequence header, or a picture header.

Meanwhile, the present invention proposes not only technology for, when all blocks to be encoded in a unit image correspond to a screen content image, encoding and transmitting information related to the resolutions of motion vectors of all blocks, but also a method and apparatus for, when a screen content region and a non-screen content region are included together in a unit image, transmitting header information, with information about those regions being included in the header information.

Figure 5:
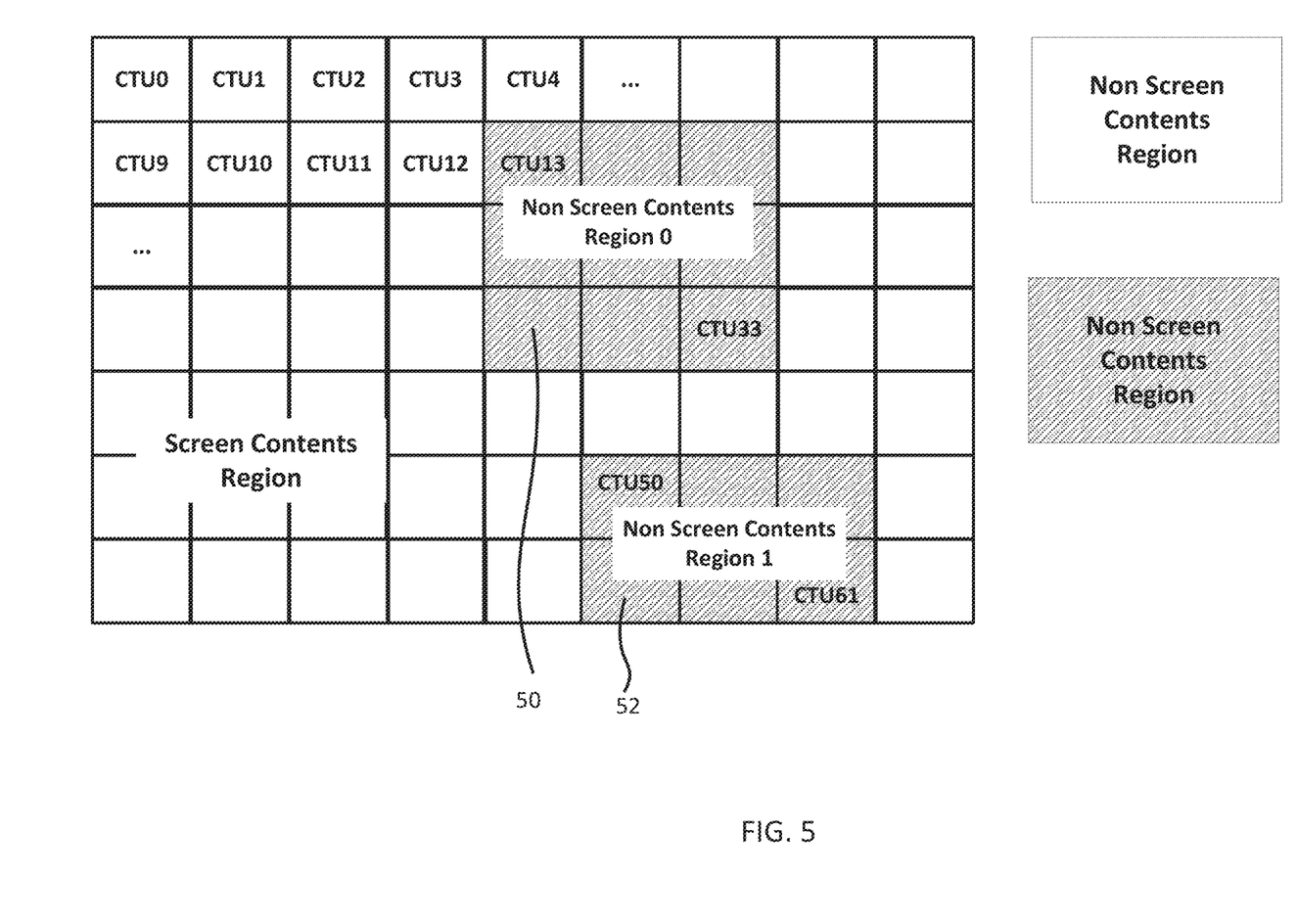
FIG. 5 is a diagram showing a method for processing screen content in the video encoding apparatus according to an embodiment of the present invention.

FIG. 5 is a diagram showing a method for processing screen content in the video encoding apparatus according to an embodiment of the present invention.

As shown in the drawing, the case where a unit image is composed of screen content regions and where one or more non-screen content regions 50 and 52 are included in the unit image may be considered.

In this way, when non-screen content regions, that is, regions, each composed of blocks for which the resolutions of motion vectors are not integer-pixel resolutions, are present, the bitstream generation unit 130 allows information about the number of non-screen content regions and the positions of the non-screen content regions to be included in header information.

Referring to the case of FIG. 5 by way of example, the number of non-screen content regions is 2. Further, the position information of the non-screen content regions may be specified by the index of a Coding Tree Unit (CTU) block. However, a CTU block may be only an example given for the convenience of description, and the corresponding regions may be specified by various types of block indexes that are usable in a video compression procedure. Further, in addition to a block index, the corresponding region may be specified by the coordinates of a start pixel of a start block and the coordinates of an end pixel of an end block in accordance with embodiments.

Figure 6:
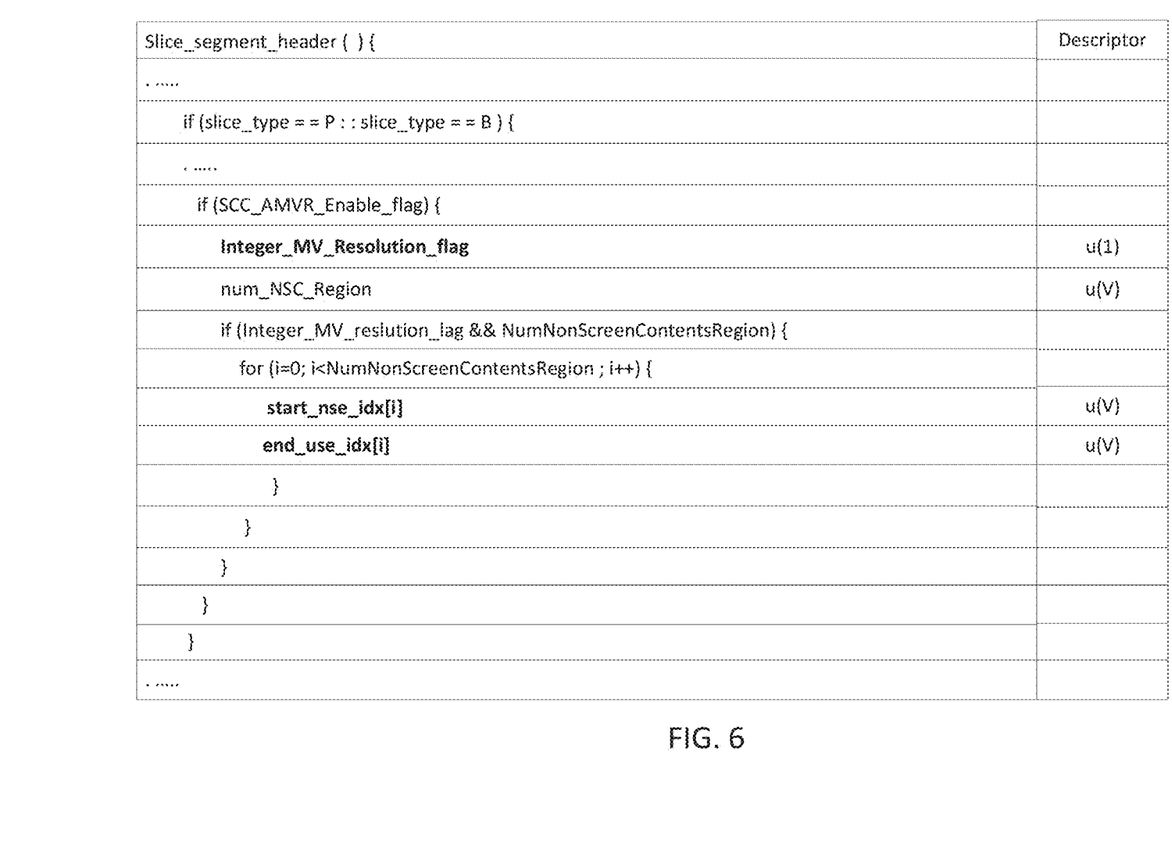
FIG. 6 is a diagram showing a syntax structure used in the video encoding apparatus according to an embodiment of the present invention.

FIG. 6 is a diagram showing a syntax structure used in the video encoding apparatus according to the embodiment of the present invention.

As shown in the drawing, information about the number of non-screen content regions NumNonScreenContentsRegion may be included in header information.

Further, information about the start block index (start_nsc_idx[i]) and end block index (end_nsc_idx[i]) of non-screen content region may be included. Here, the coordinate values of the upper-left vertex of the non-screen content region may be calculated based on the start block index, and the coordinate values of the lower-right vertex of the non-screen content region may be calculated based on the end block index.

More specifically, the horizontal coordinate value (start_nsc_point_x[i]) and the vertical coordinate value (start_nsc_point_y[i]) of the upper-left vertex may be individually calculated using the following Equation 1:

$$\text{start\_nsc\_point\_y}[i] = (\text{start\_nsc\_idx}[i] / \text{PicWidthInCtbsY}) << \log2\text{CtbSize}$$

$$\text{start\_nsc\_point\_x}[i] = (\text{start\_nsc\_idx}[i] \% \text{PicWidthInCtbsY}) << \log2\text{CtbSize} \quad \text{[Equation 1]}$$

In this case, PictWidthInCtbsY denotes a value obtained by dividing the horizontal length of a picture by the length of one side of the CTU and rounding off the resultant value. That is, the value, which is obtained by dividing the start block index by PictWidthInCtbsY and performing a shift operation on the remainder, is set to the horizontal coordinate value (start_nsc_point_x[i]), and the value, which is obtained by dividing the start block index by PictWidthInCtbsY and performing a shift operation on the quotient, is set to the vertical coordinate value (start_nsc_point_y[i]).

Further, the horizontal coordinate value (end_nsc_point_x[i]) and vertical coordinate value (end_nsc_point_y[i]) of the lower right vertex may be individually calculated using the following Equation 2:

$$end\_nsc\_point\_y[i] = CtbSize + (end\_nsc\_idx[i] / PicWidthInCtbsY) << log2CtbSize$$

$$end\_nsc\_point\_x[i] = CtbSize + (end\_nsc\_idx[i] \% PicWidthInCtbsY) << log2CtbSize \quad [\text{Equation 2}]$$

Here, PictWidthInCtbsY denotes a value obtained by dividing the horizontal length of the picture by the length of one side of a CTU and rounding off the resultant value. That is, the value, which is obtained by dividing the end block index by PictWidthInCtbsY and performing a shift operation on the remainder, is added to the value corresponding to the length of one side of the CTU, and the resultant value is set to the horizontal coordinate value end_nsc_point_x[i]. The value, obtained by dividing the end block index by PictWidthInCtbsY and performing a shift operation on the quotient, is added to the value corresponding to the length of one side of the CTU, and the resultant value is set to the vertical coordinate value end_nsc_point_y[i].

Meanwhile, in FIGS. 5 and 6, a description has been chiefly made based on the case where a non-screen content region is included in screen content, but the present invention may be sufficiently applied even to the opposite case. That is, the case where one or more screen content regions are included in a non-screen content region may be considered.

In this case, the bitstream generation unit 130 allows information about the number of screen content regions and the position information of the screen content regions to be included in header information.

Meanwhile, in the present invention, in a process for encoding motion vectors when screen content and a non-screen content region are included together, the procedure for scaling a prediction vector of a motion vector extracted from a neighboring block, depending on the resolution of each motion vector may be performed.

Figure 7:
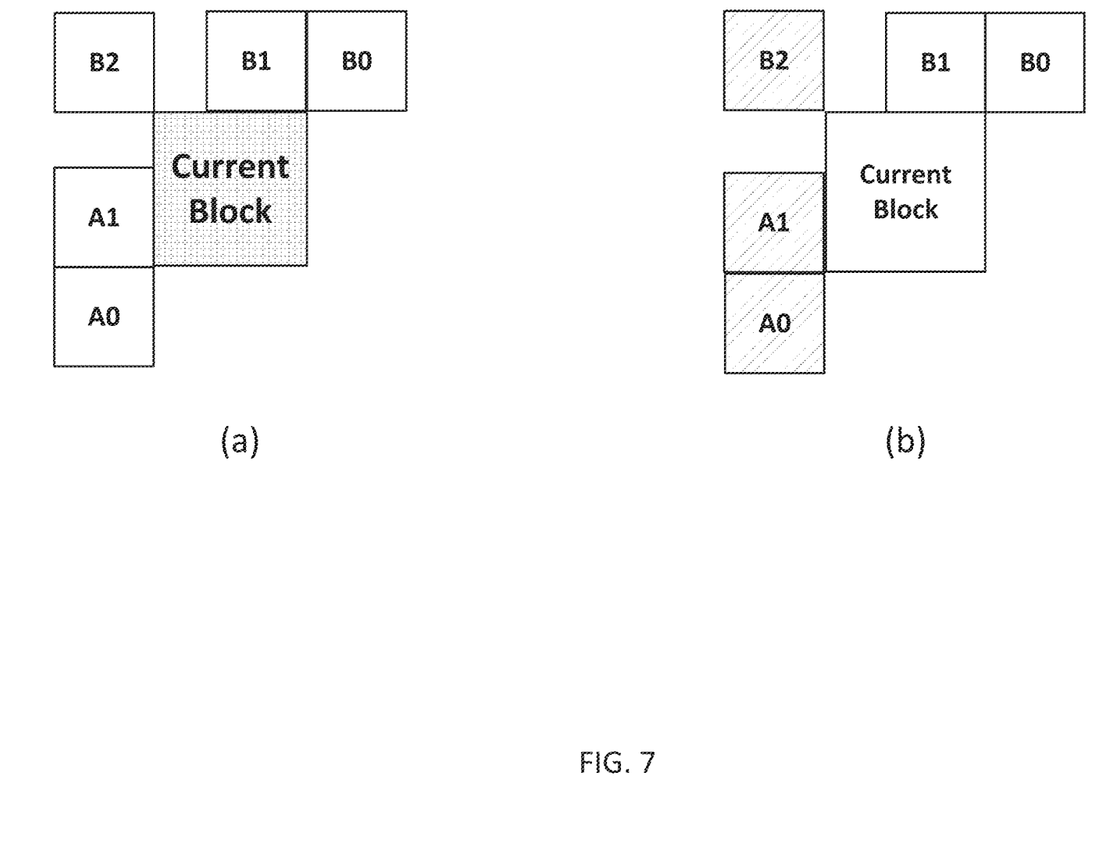
FIG. 7 is a diagram showing a motion vector prediction procedure using a motion vector of the current block and motion vectors of neighboring blocks in a motion vector encoding process according to an embodiment of the present invention.

FIG. 7 is a diagram showing a motion vector scaling procedure performed during a motion vector encoding process according to an embodiment of the present invention.

FIG. 7(a) illustrates the case where a target block to be encoded is not screen content and blocks neighboring the target block to be encoded are screen content.

In this case, since the motion vectors of the neighboring blocks have integer-pixel resolutions, predicted motion vectors based on the motion vectors also have integer-pixel resolutions. However, since the motion vector of the target block to be encoded has a sub-pixel resolution, there is a need to perform scaling, which matches the resolution units of motion vectors when obtaining a differential motion vector.

Then, the present invention scales the motion vectors of neighboring blocks with respect to the motion vector of the target block to be encoded.

That is, the motion vectors of the neighboring blocks are scaled to sub-pixel units, and a differential motion vector is calculated based on the scaled motion vectors. For example, when the motion vector of the target block to be encoded is a ¼ pixel unit, the motion vectors of the neighboring blocks are converted into the form of 4n/4 pixel units. That is, when the motion vector of the neighboring block is 1, it is scaled to 4/4, and when the motion vector of the neighboring block is 2, it is scaled to 8/4, and then the scaled values are indicated.

FIG. 7(b) illustrates the case where the target block to be encoded is screen content and blocks neighboring the target block to be encoded are not screen content.

In this case, since the motion vectors of neighboring blocks have sub-pixel resolutions, predicted motion vectors based on the motion vectors also have sub-pixel resolutions. However, since the motion vector of the target block to be encoded has an integer-pixel resolution, there is a need to perform scaling, which matches the resolution units of motion vectors when obtaining a differential motion vector.

Therefore, the present invention scales the motion vectors of neighboring blocks based on the resolution of the motion vector of the target block to be encoded.

That is, the motion vectors of neighboring blocks, which are represented by sub-pixel units, are mapped to values in integer-pixel units depending on the values of the motion vectors. For example, the motion vectors may be mapped to values corresponding to quotients for values in a sub-pixel-unit. When the motion vectors of neighboring blocks are ¼ pixel units, if quotients for the values in the sub-pixel unit are less than 1 (e.g. 0, ¼, 2/4, ¾), the corresponding motion vectors are mapped to 0, whereas if the quotients for the values in the sub-pixel unit are 1 (e.g. 4/4, 5/4, 6/4, 7/4), the corresponding motion vectors are mapped to 1.

By means of this scaling procedure, motion vector encoding may be performed even in the case where a screen content region and a non-screen content region are included together.

Figure 8:
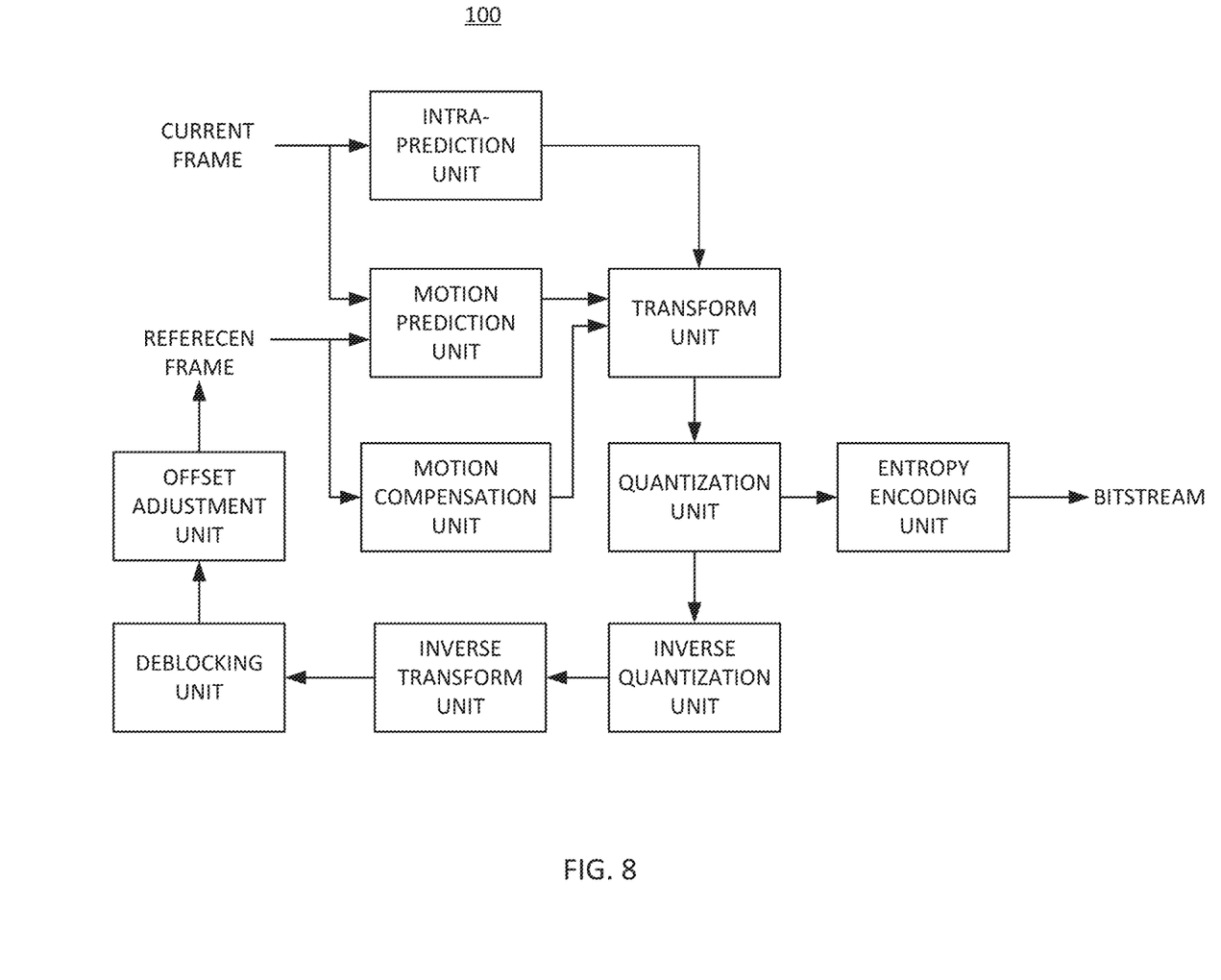
FIG. 8 is a diagram showing the detailed configuration of the video encoding apparatus according to the embodiment of the present invention.

FIG. 8 is a diagram showing the detailed configuration of the video encoding apparatus according to the embodiment of the present invention.

As shown in the drawing, the video encoding apparatus 100 may further include an intra-prediction unit for performing intra prediction on the current frame, a motion prediction unit for searching for a predicted block most similar to the target block to be currently encoded from reference frames in an inter-prediction procedure, and a motion compensation unit for performing motion compensation based on the motion vector of the optimal predicted block found via motion prediction. Further, data, output from the intra-prediction unit, the motion prediction unit, and the motion compensation unit, is output in the form of a bitstream after passing through a transform unit, a quantization unit, and an entropy encoding unit. Further, quantized transform coefficients, obtained via frequency transform and quantization steps, are reconstructed into spatial domain data while passing through an inverse quantization unit and an inverse transform unit, and the reconstructed spatial domain data is output as a reference frame while passing through a deblocking unit and an offset adjustment unit. Such a video encoding algorithm corresponds to the conventional technology, and thus a detailed description thereof will be omitted.

Figure 9:
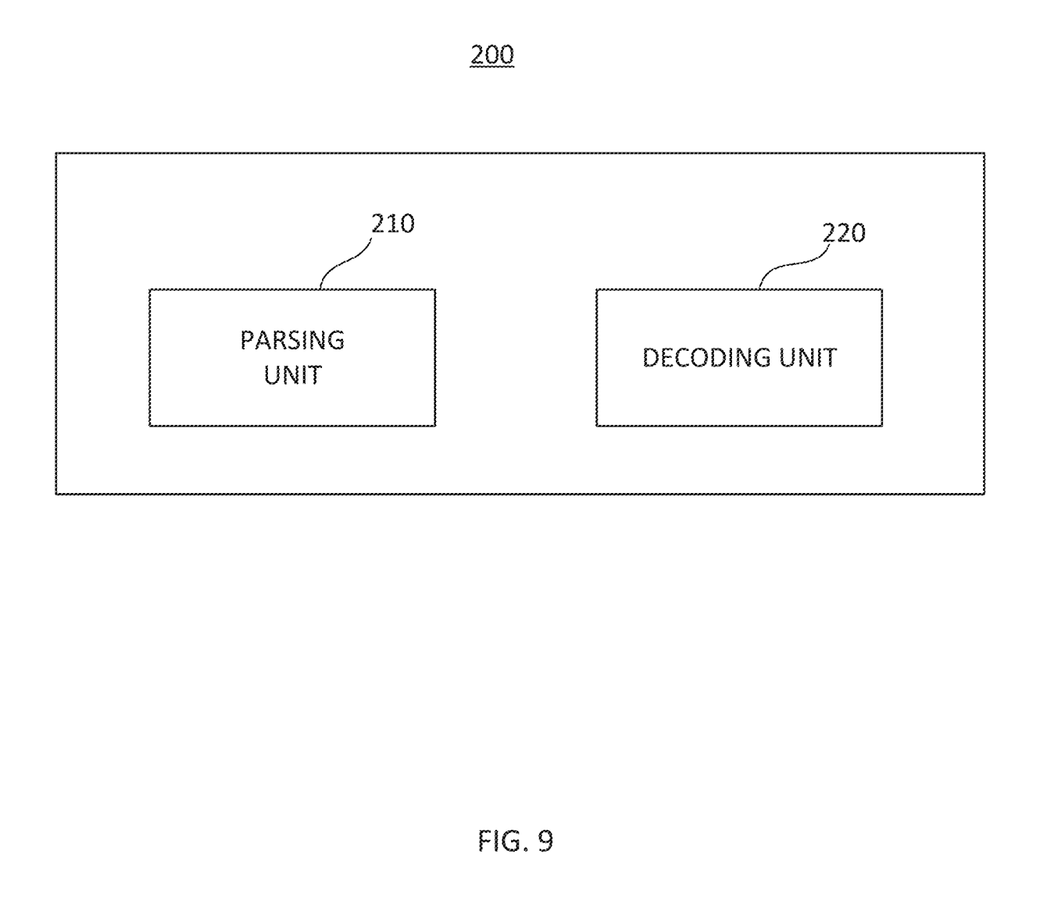
FIG. 9 is a block diagram showing the configuration of a video decoding apparatus according to an embodiment of the present invention.

FIG. 9 is a block diagram showing the configuration of a video decoding apparatus according to an embodiment of the present invention.

A video decoding apparatus 200 includes a parsing unit 210 for receiving and parsing a bitstream and a decoding unit 220 for reconstructing an image based on parsed data.

The parsing unit 210 extracts information about the resolutions of motion vectors of each unit image from header information included in a target bitstream to be decoded. As described above, the bitstream output from the video encoding apparatus 100 includes flag information indicating whether the resolutions of all motion vectors included in the unit image are integer-pixel resolutions. Further, when the input image may include regions, each composed of blocks for which the resolutions of motion vectors are not integer-pixel resolutions, the bitstream may include information about the number and positions of the regions. Furthermore, when coding blocks included in a unit image have sub-pixel-unit motion vectors, if the input image includes a region composed of blocks for which the resolutions of motion vectors of some coding blocks in the corresponding image are integer-pixel resolutions, the bitstream may include information about the number and positions of the corresponding regions. The parsing unit 210 extracts such information by parsing the bitstream.

The decoding unit 220 may reconstruct a target block based on the difference signal between the predicted block included in the bitstream and the original block and on the motion vectors. That is, the predicted block is determined via a motion compensation procedure based on motion vectors, and the original block may be reconstructed by adding the predicted block to the difference signal. Further, the decoding unit 220 decodes a difference vector between the motion vector of the current block included in the bitstream and the predicted motion vector.

Further, the decoding unit 220 decodes a unit image based on resolution information extracted by the parsing unit 210. For example, based on the flag information indicating that the resolutions of all motion vectors included in each unit image are based on integer-pixel resolutions, decoding is performed on the corresponding unit image on a per-integer-pixel basis.

In accordance with the above-described motion vector encoding process, if it is determined that the resolutions of all motion vectors are integer-pixel resolutions, there is a need only to search for code numbers by considering only the indexes of integer-pixel units, without considering the indexes of sub-pixel-units, thus improving decoding efficiency.

As described above with reference to FIGS. 4 and 5, when a unit image includes one or more non-screen content regions, the header information may include information about the number and positions of the regions.

Based on such header information, the decoding unit 220 performs decoding on screen content regions on a per-integer-pixel basis, and performs decoding on the remaining regions in consideration even of sub-pixel units.

Meanwhile, such header information may include the index information of a start block and the index information of an end block, among blocks having resolutions that are not integer-pixel resolutions. The decoding unit 220 may calculate the coordinate values of the upper-left vertex of the start block and the coordinate values of the lower-right vertex of the end block, based on both the index information of the start block and the index information of the end block. That is, as described above, respective coordinate values may be calculated using the above-described Equations 1 and 2.

Further, when one or more screen content regions are included in a unit image, the header information may include information about the number and positions of the regions. Further, such header information may include the index information of a start block and the index information of an end block among blocks in regions having integer-pixel resolutions. Furthermore, according to embodiments, in addition to block indexes, information about the coordinates of a start pixel of a start block and the coordinates of an end pixel of an end block may be included in the header information.

Further, when screen content regions and non-screen content regions are included together, the decoding unit 220 may perform a procedure for scaling prediction vectors for motion vectors extracted from neighboring blocks depending on the resolutions of respective motion vectors. That is, as described above with reference to FIG. 7, when the resolutions of motion vectors for the target block to be decoded and neighboring blocks thereof are different from each other, there is a need to perform scaling, which matches the units of resolutions when obtaining a differential motion vector.

That is, as shown in FIG. 7(*a*), when the target block to be decoded is not screen content and the blocks neighboring the target block to be decoded are screen content, the motion vectors of the neighboring blocks are scaled with respect to the resolution of the target block to be decoded. That is, the motion vectors of the neighboring blocks are scaled to sub-pixel units, and a differential motion vector is calculated based on the scaled motion vectors. For example, when the motion vector of the target block to be decoded is a ¼ pixel unit, the motion vectors of the neighboring blocks are converted into the form of 4n/4 pixel units. That is, when the motion vector of the neighboring block is 1, it is scaled to 4/4, and when the motion vector of the neighboring block is 2, it is scaled to 8/4, and then the scaled values are indicated. Further, as shown in FIG. 7(*b*), when the target block to be decoded is screen content and the blocks neighboring the target block to be decoded are not screen content, the motion vectors of the neighboring blocks are scaled with respect to the resolution of the target block to be decoded. That is, the motion vectors of neighboring blocks, which are represented by sub-pixel units, are mapped to values in integer-pixel units depending on the values of the motion vectors. For example, the motion vectors may be mapped to values corresponding to quotients for values in a sub-pixel-unit. When the motion vectors of neighboring blocks are ¼ pixel units, if quotients for the values in the sub-pixel unit are less than 1 (e.g. 0, ¼, 2/4, ¾), the corresponding motion vectors are mapped to 0, whereas if the quotients for the values in the sub-pixel unit are 1 (e.g. 4/4, 5/4, 6/4, 7/4), the corresponding motion vectors are mapped to 1. By means of this scaling procedure, motion vector decoding may be performed even in the case where a screen content region and a non-screen content region are included together.

Figure 10:
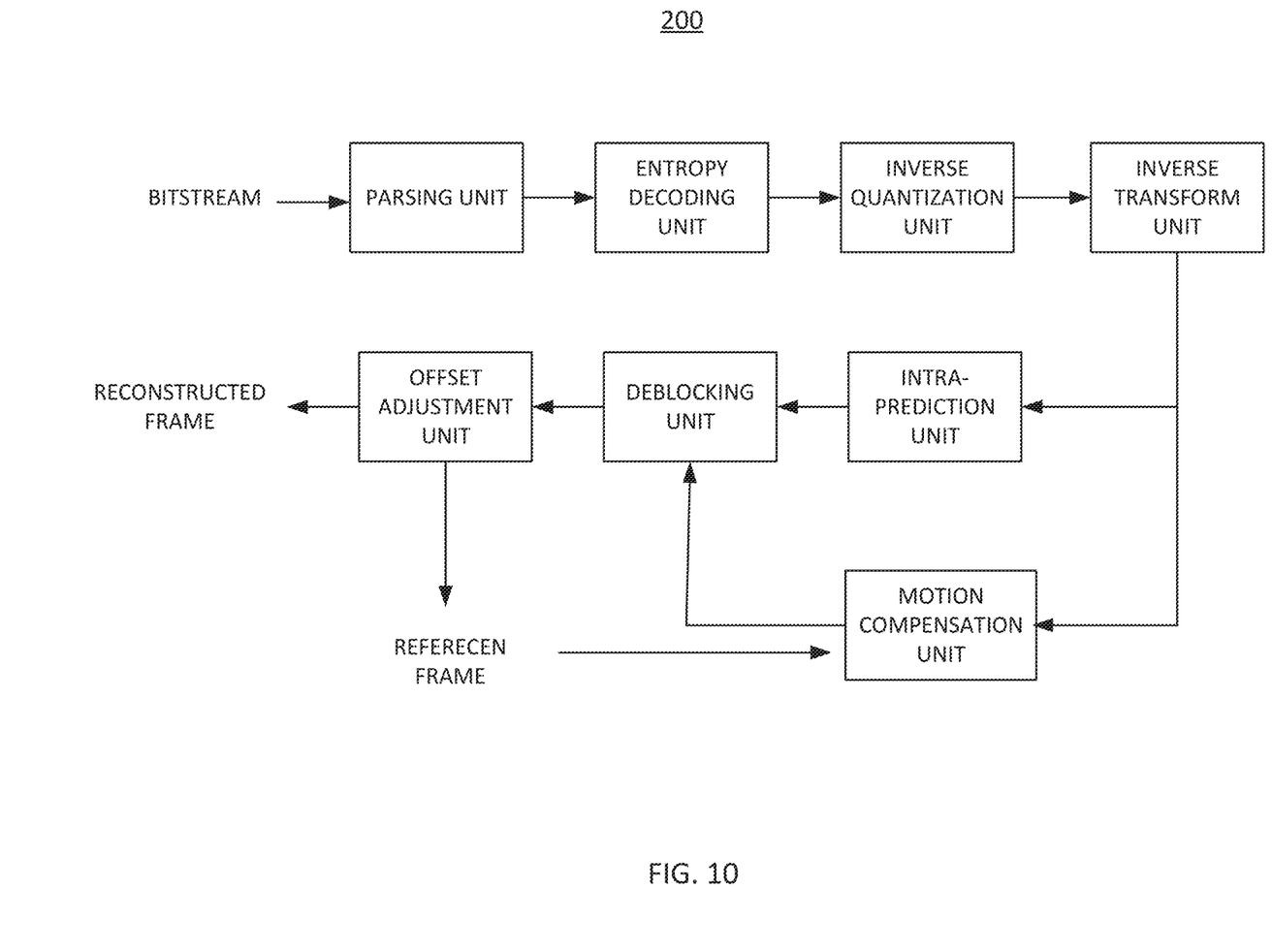
FIG. 10 is a diagram showing the detailed configuration of the video decoding apparatus according to the embodiment of the present invention.

FIG. 10 is a diagram showing the detailed configuration of the video decoding apparatus according to the embodiment of the present invention.

As shown in the drawing, the video decoding apparatus 200 includes a parsing unit for receiving and parsing a bitstream and outputting encoded image data and various types of information required for decoding. Further, the encoded image data is output as inversely quantized data while passing through an entropy decoding unit and an inverse quantization unit, and is then reconstructed into spatial domain image data while passing through an inverse transform unit. An intra-prediction unit performs intra prediction on spatial domain image data for each encoding unit in an intra mode, and a motion compensation unit performs motion compensation for each encoding unit in an inter mode using a reference frame. Spatial domain data, obtained after passing through the intra-prediction unit and the motion compensation unit, is post-processed while passing through a deblocking unit and an offset adjustment unit, and then a reconstructed frame is output. Further, the data, which is post-processed through the deblocking unit and the offset adjustment unit, may be output as a reference frame. Such a video coding algorithm corresponds to the conventional technology, and thus a detailed description thereof will be omitted.

For reference, the components shown in FIG. 2 or 9 according to the embodiment of the present invention may denote software components, or hardware components such as a Field Programmable Gate Array (FPGA) or an Application Specific Integrated Circuit (ASIC), and may perform predetermined functions.

The components included in embodiments of the present invention are not limited to software or hardware, and may be configured to be stored in addressable storage media and to execute on one or more processors.

Therefore, as an example, the components may include components such as software components, object-oriented software components, class components, and task components, processes, functions, attributes, procedures, subroutines, segments of program code, drivers, firmware, microcode, circuitry, data, databases, data structures, tables, arrays, and variables.

The components and functionality provided in the corresponding components may be combined into fewer components, or may be further separated into additional components.

The video encoding apparatus and the video decoding apparatus according to the embodiments of the present invention may be any of a Personal Computer (PC), a notebook computer, a Personal Digital Assistant (PDA), a portable Multimedia Player (PMP), a PlayStation Portable (PSP), a mobile communication terminal, a smart phone, a tablet PC, etc., and may denote various types of devices, each including a communication device such as a communication modem for performing communication with various types of devices or wired/wireless communication networks, memory for storing various types of programs and data required to encode or decode images, a microprocessor for executing programs and performing operations and control, etc.

Further, images encoded into a bitstream by the video encoding apparatus may be transmitted to the video decoding apparatus in real time or in non-real time over wired/wireless communication networks such as the Internet, a short-range wireless communication network, a wireless Local Area Network (LAN), a Wibro network, or a mobile communication network, or through a communication interface such as a cable or a Universal Serial Bus (USB), and may then be reconstructed and reproduced as images.

The embodiments of the present invention may also be implemented in the form of storage media including instructions that are executed by a computer, such as program modules executed by the computer. The computer-readable media may be arbitrary available media that can be accessed by the computer, and may include all of volatile and non-volatile media and removable and non-removable media. Further, the computer-readable media may include all of computer storage media and communication media. The computer-storage media include all of volatile and nonvolatile media and removable and non-removable media, which are implemented using any method or technology for storing information, such as computer-readable instructions, data structures, program modules or additional data. The communication media typically include transmission media for computer-readable instructions, data structures, program modules or additional data for modulated data signals, such as carrier waves, or additional transmission mechanisms, and include arbitrary information delivery media.

Although the method and system of the present invention have been described in relation to specific embodiments, the some or all of the components or operations thereof may be implemented using a computer system that has general-purpose hardware architecture.

The description of the present invention is intended for illustration, and those skilled in the art will appreciate that the present invention can be easily modified in other detailed forms without changing the technical spirit or essential features of the present invention. Therefore, the above-described embodiments should be understood as being exemplary rather than restrictive. For example, each component described as a single component may be distributed and practiced, and similarly, components described as being distributed may also be practiced in an integrated form.

The scope of the present invention should be defined by the accompanying claims rather than by the detailed description, and all changes or modifications derived from the meanings and scopes of the claims and equivalents thereof should be construed as being included in the scope of the present invention.

INDUSTRIAL APPLICABILITY

The present invention has industrial applicability in technical fields for improving the efficiency of procedures for encoding and decoding screen content video.

The invention claimed is:

1. A video encoding apparatus using motion vector resolution scaling, comprising: a bitstream generation unit for including information about resolutions of motion vectors of respective blocks, determined based on motion prediction for a unit image, in header information of a bitstream; a motion prediction unit for performing motion prediction on the unit image on a per-block basis; and a motion vector encoding unit for encoding motion vectors determined for respective blocks in a motion prediction procedure, wherein the header information includes flag information indicating whether resolutions of all motion vectors included in the unit image are integer-pixel resolutions, wherein the motion vector encoding unit is configured to, when a resolution of a motion vector of a target block to be encoded is an integer-pixel resolution, map a motion vector of a neighboring block to a value corresponding to a value in integer-pixel units depending on a value in sub-pixel units of the motion vector of the neighboring block to be mapped with the resolution of the motion vector of the target block to be encoded, and wherein the motion vector encoding unit is configured to map the motion vector of the neighboring block by eliminating a value, which is available to be represented in sub-pixel units but not available to be represented in integer-pixel units, from the value in the sub-pixel units of the motion vector of the neighboring block.

2. The video encoding apparatus of claim 1, wherein the motion vector encoding unit is configured to, when the resolution of the motion vector of the target block to be encoded is a sub-pixel resolution and the resolution of the motion vector of the neighboring block is an integer-pixel resolution, map the motion vector of the neighboring block to a value obtained by scaling values in an integer unit of the motion vector of the neighboring block to values in a sub-pixel unit.

3. A video decoding apparatus using motion vector resolution scaling, comprising: a parsing unit for extracting information about resolutions of motion vectors of each unit image from header information included in a target bitstream to be decoded; and a decoding unit for decoding the unit image based on resolution information, wherein the header information includes flag information indicating whether resolutions of all motion vectors included in the unit image are integer-pixel resolutions, wherein the decoding unit reconstructs a target block based on a difference signal between a predicted block and an original block and a motion vector, wherein the decoding unit is configured to, when the flag information indicating that a resolution of a motion vector of a target block to be decoded is an integer-pixel resolution, map a motion vector of a neighboring block to a value corresponding to a value in integer-pixel units depending on a value in sub-pixel units of the motion vector of the neighboring block to be mapped with the resolution of the motion vector of the target block to be decoded, and wherein the decoding unit is configured to map the motion vector of the neighboring block by eliminating a value, which is available to be represented in sub- pixel units but not available to be represented in integer-pixel units, from the value in the sub-pixel units of the motion vector of the neighboring block.

4. The video decoding apparatus of claim 3, wherein the decoding unit performs decoding on the corresponding unit image on a per-integer-pixel basis based on the flag information indicating that resolutions of all motion vectors included in the unit image are integer-pixel resolutions.

5. The video decoding apparatus of claim 3, wherein the decoding unit is configured to, when the resolution of the motion vector of the target block to be decoded is a sub-pixel resolution and the resolution of the motion vector of the neighboring block is an integer-pixel resolution, map the motion vector of the neighboring block to a value obtained by scaling values in an integer unit of the motion vector of the neighboring block to values in a sub-pixel unit.

6. A non-transitory computer-readable medium storing instructions, the instructions comprising: a bitstream generation unit for including information about resolutions of motion vectors of respective blocks, determined based on motion prediction for a unit image, in header information of a bitstream; a motion prediction unit for performing motion prediction on the unit image on a per-block basis to generate a predicted block for a target block; and a motion vector encoding unit for encoding motion vectors determined for respective blocks in a motion prediction procedure, a difference signal generating unit for generating a difference signal using the target block and the predicted block, wherein the header information includes flag information indicating whether resolutions of all motion vectors included in the unit image are integer-pixel resolutions, wherein the difference signal is generated by subtracting the predicted block from the target block, wherein the motion vector encoding unit is configured to, when a resolution of a motion vector of the target block to be encoded is an integer-pixel resolution, map a motion vector of a neighboring block to a value corresponding to a value in integer-pixel units depending on a value in sub-pixel units of the motion vector of the neighboring block to be mapped with the resolution of the motion vector of the target block to be encoded, and wherein the motion vector encoding unit is configured to map the motion vector of the neighboring block by eliminating a value, which is available to be represented in sub-pixel units but not available to be represented in integer-pixel units, from the value in the sub-pixel units of the motion vector of the neighboring block.

* * * * *